Jan. 8, 1935.    H. D. GEYER    1,987,189
SPRING CLIP FOR MULTIPLE LEAF SPRINGS
Original Filed Jan. 3, 1933

INVENTOR
Harvey D. Geyer
BY
Spencer Hardman & Fehr
his ATTORNEYS

Patented Jan. 8, 1935

1,987,189

UNITED STATES PATENT OFFICE 1,987,189

SPRING CLIP FOR MULTIPLE LEAF SPRINGS

Harvey D. Geyer, Dayton, Ohio, assignor, by mesne assignments, to General Motors Corporation, Detroit, Mich., a corporation of Delaware Original application January 3, 1933, Serial No. 649,929. Divided and this application March 8, 1933, Serial No. 660,000

6 Claims. (Cl. 267—53)

This invention relates to an improved form of spring clip for aiding in properly holding the leaves of a multiple leaf spring together.

An object of this invention is to provide a metal spring clip with a resilient rubber pad or other non-metallic lining interposed and compressed between the metal clip and the spring leaves in such manner as to isolate the metal clip from all but one of the spring leaves and so prevent squeaking and wear which occurs with ordinary clips. A feature of this invention is the substantially non-slipping relation maintained between the compressed rubber pad and the metal parts contacting therewith, whereby the useful life of the rubber pad is greatly increased due to there being little or no wear thereupon.

This invention is disclosed, but not claimed, in my copending application Serial No. 649,929, filed January 3, 1933, of which the instant application is a division.

Further objects and advantages of the present invention will be apparent from the following description, reference being had to the accompanying drawing, wherein a preferred embodiment of one form of the present invention is clearly shown.

In the drawing.

Similar reference characters refer to similar parts throughout the several views.

Numeral 10 designates as a whole a multiple leaf spring of the type used on present day automobiles. In the form illustrated, the seven leaf semi-elliptic spring has the long leaf thereof on top of the progressively shorter leaves and is provided with a spring eye 11 rolled in each end thereof. The leaves are clamped together at their central portions by a central through-bolt 15 and nut 16. These spring leaves are further retained in proper position by the spring clips 20 and 21 which comprise the novel part of this device.

Figure 3:
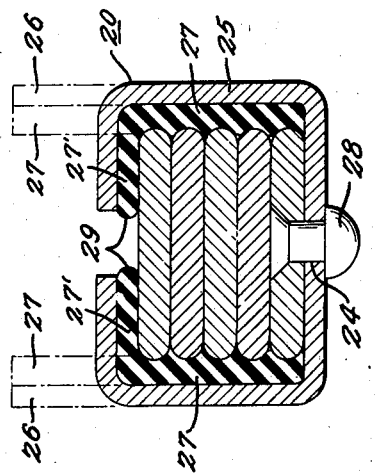
Fig. 3 is a section on line 3—3 of Fig. 1.

The spring clip 20 comprises a metal band 25 which is first made U-shaped, as clearly shown by the dotted extension 26 in Fig. 3. While band 25 is in this U-form the resilient rubber pads 27 are secured to the inside surfaces of the legs of the U-form, preferably by being directly bonded to the metal by vulcanization. The rubber pads may be bonded to the metal band by being moulded in situ. These resilient rubber pads 27 when not under compression are preferably approximately the thickness of a spring leaf so that after the clip 20 is assembled upon the spring as shown in full lines in Fig. 3, there will be a substantial thickness of rubber between the edges of the spring leaves and the metal band 25. The legs of the U-form with the pads 27 in place are so spaced apart that this U-form unit may be slipped upon the spring leaves and fit very snugly thereupon prior to the bending over of the end portions 26. The metal band 25 has a central hole 24 which passes over the rivet 28, after which rivet 28 is headed up to rigidly fix the metal band 25 to the bottommost leaf. The end portions 26, together with the attached rubber pads, are then bent down upon the top leaf to such an extent as to highly compress the resilient rubber pads 27 and to force the rubber into a tight non-slipping contact with the spring leaves. Since the rubber fits very snugly upon the spring leaves prior to such bending, the desired compression of the rubber by such bending over of the portions 26 is facilitated.

The full lines of Fig. 3 show the rubber under considerable compression as indicated by the decreased thickness of the portions 27' and the outward bulging of the rubber at 29.

Figure 1:
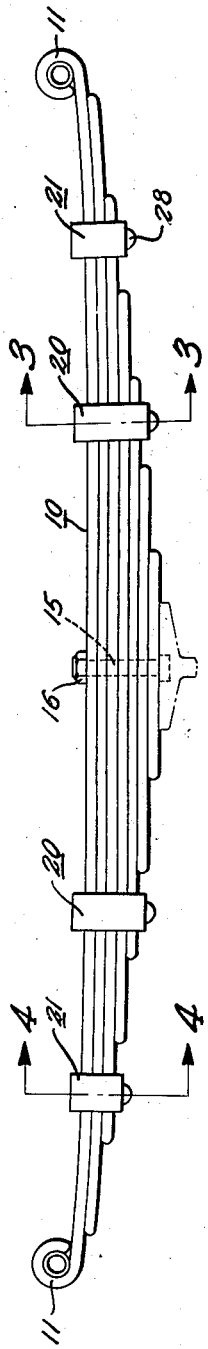
Fig. 1 is a side elevation of an automobile leaf spring with spring clips thereon made according to this invention.
Figure 2:
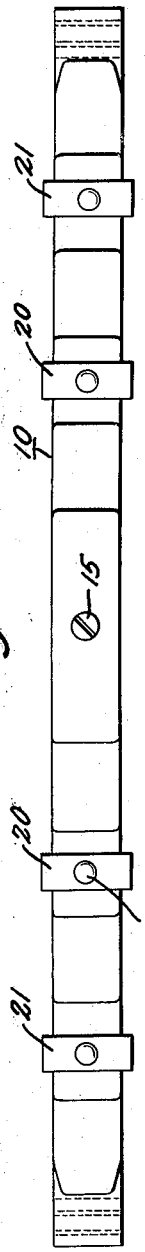
Fig. 2 is a bottom view of Fig. 1.
Figure 4:
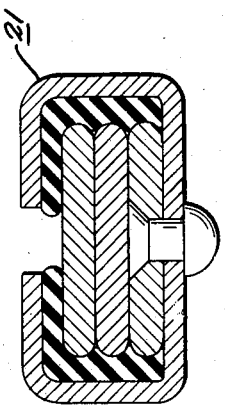
Fig. 4 is a section on line 4—4 of Fig. 1.

The spring clip 21, shown in section in Fig. 4, is made in the same manner as clip 20 above described, the only difference being that clip 21 is designed to embrace three spring leaves while clip 20 embraces five spring leaves. In Figs. 1 and 2 four spring clips are shown, but obviously more or less than four clips on a single leaf spring may be used. Preferably only as many clips are used as will properly maintain the spring leaves in alignment.

In operation, the resilient rubber pads 27 permit the necessary relative longitudinal sliding of the separate leaves upon each other by a distortion of the resilient rubber rather than by a sliding of the leaves upon the rubber surface, this action being due to the compression under which the rubber is maintained at all times. Obviously if there is little or no sliding of the contacting metal parts upon the rubber surface there will be little or no wear upon the rubber and hence the life of the rubber is very greatly increased. Preferably pads 27 are made from an oil-resisting rubber compound so they will not suffer material deterioration from oil or grease which may be used as a spring lubricant.

If desired, the rubber pads 27 may be held in non-slipping relation with the metal bands 25 by interlocking grooves, shoulders, or lugs rather than by a vulcanized bond as described above.

While the form of embodiment of the present invention as herein disclosed, constitutes a preferred form, it is to be understood that other forms might be adopted, all coming within the scope of the claims which follow.

What is claimed is as follows:

1. In combination, a multiple leaf spring, a spring clip for maintaining the spring leaves in alignment, said clip comprising: an intially U-shaped metal band inserted about the leaf spring and attached to only one of the spring leaves, resilient rubber lining the inner surface of the sides of said U-shaped band and bonded thereto and serving to isolate the other spring leaves from said band, the end portions of said U-shaped band being bent over upon the outermost isolated leaf in such manner as to compress said rubber into a normally non-slipping relation with said spring leaves.

2. In combination, a multiple leaf spring having a plurality of superposed leaves arranged to slide relative to each other when the spring is flexed, a spring clip both compressing said leaves together and maintaining them in alignment and comprising: a metal band secured to one of said spring leaves and extending around the other leaves, and resilient rubber interposed between and isolating said band and the other leaves, said rubber being maintained under a high initial compression.

3. In combination, a multiple leaf spring having a plurality of superposed leaves arranged to slide relative to each other when the spring is flexed, a spring clip both compressing said leaves together and maintaining them in alignment and comprising: a metal band secured to one of said spring leaves and extending around the other leaves and a resilient rubber pad interposed and compressed between each side of said band and the other leaves in such manner as to provide that relative sliding between the leaves and metal band normally takes place by distortion of the resilient rubber rather than by relative slipping of these parts upon said pad.

4. In combination, a multiple leaf spring having a plurality of superposed leaves arranged to slide relative to each other when the spring is flexed, a spring clip both resiliently compressing said leaves together and maintaining them in alignment and comprising: a metal band fixed to one of said leaves and extending around the other leaves, and resilient rubber bonded by vulcanization to the inner surface of said metal band and held so compressed between said band and the other spring leaves that said rubber is forced into a substantially non-slipping relation with said other leaves, the normal relative movement between said leaves being taken by internal distortion of the rubber.

5. In combination, a multiple leaf spring having a plurality of superposed leaves arranged to slide relative to each other when the spring is flexed, a spring clip for said leaves comprising: a metal band fixed to one of said leaves and extending around the other leaves, and resilient non-metallic material bonded by being molded in situ to the inner surface of said metal band and arranged to prevent contact between said band and the other of said leaves when said leaf spring is flexed.

6. A spring clip for a multiple leaf spring comprising: an integral metal band bent around the leaf spring so as to maintain said leaves in alignment, said band being rigidly fixed to one outside leaf at the location of the clip, and resilient rubber interposed and compressed between said band and the remaining spring leaves and isolating said band from the remaining leaves, said resilient rubber permitting relative sliding between the leaves by internal distortion.

HARVEY D. GEYER.